US 8,463,866 B2
Jun. 11, 2013

(12) United States Patent
Haviv (54) MEMORY SYSTEM FOR MAPPING SCSI COMMANDS FROM CLIENT DEVICE TO MEMORY SPACE OF SERVER VIA SSD

(75) Inventor: Yaron Haviv, Zoran (IL)

(73) Assignee: Mellanox Technologies TLV Ltd., Ra'anana (IL)

( * ) Notice: Subject to any disclaimer, the term of this patent is extended or adjusted under 35 U.S.C. 154(b) by 165 days.

This patent is subject to a terminal disclaimer.

(21) Appl. No.: 13/064,126

(22) Filed: Mar. 8, 2011

(65) Prior Publication Data

US 2011/0213854 A1 Sep. 1, 2011

Related U.S. Application Data

(63) Continuation of application No. 12/328,140, filed on Dec. 4, 2008, now Pat. No. 7,921,178.

(51) Int. Cl.
  *G06F 15/167* (2006.01)
(52) U.S. Cl.
  USPC ............ 709/212; 709/217; 709/218; 709/219
(58) Field of Classification Search
  USPC 709/212, 217, 218, 219, 250; 718/1; 719/313
  See application file for complete search history.

(56) References Cited

U.S. PATENT DOCUMENTS

| | | | |
|---|---|---|---|
| 5,813,024 A | 9/1998 | Saito | |
| 7,234,006 B2 | 6/2007 | Westrelin | |
| 2003/0061296 A1* | 3/2003 | Craddock et al. | 709/212 |
| 2004/0049600 A1* | 3/2004 | Boyd et al. | 709/250 |
| 2004/0093389 A1 | 5/2004 | Mohamed et al. | |
| 2005/0097183 A1 | 5/2005 | Westrelin | |
| 2008/0126578 A1 | 5/2008 | Krithivas | |
| 2008/0140931 A1 | 6/2008 | Nakamura et al. | |
| 2009/0106771 A1* | 4/2009 | Benner et al. | 719/313 |
| 2010/0083247 A1* | 4/2010 | Kanevsky et al. | 718/1 |

* cited by examiner

*Primary Examiner* — Le H Luu (74) *Attorney, Agent, or Firm* — Eitan, Mehulal & Sadot (57) ABSTRACT

Device, system, and method of accessing storage. For example, a server includes: a Solid-State Drive (SSD) to store data; a memory mapper to map at least a portion of a storage space of the SSD into a memory space of the server; and a network adapter to receive a Small Computer System Interface (SCSI) read command incoming from a client device, to map one or more parameters of the SCSI read command into an area of the memory space of the server from which data is requested to be read by the client device, said area corresponding to a storage area of the SSD, and to issue a Remote Direct Memory Access (RDMA) write command to copy data directly to the client device from said area of the memory space corresponding to the SSD.

20 Claims, 2 Drawing Sheets

MEMORY SYSTEM FOR MAPPING SCSI COMMANDS FROM CLIENT DEVICE TO MEMORY SPACE OF SERVER VIA SSD

PRIOR APPLICATION DATA

The present application is a Continuation of U.S. patent application Ser. No. 12/328,140, filed on Dec. 4, 2008 now U.S. Pat. No. 7,921,178, titled "Device, System, and Method of Accessing Storage", which is hereby incorporated by reference in its entirety.

FIELD

Some embodiments are related to the field of electronic communication, and more particularly to accessing storage.

BACKGROUND

In some communication systems, a client device (e.g., a Personal Computer) may communicate over a wired or wireless network with a server. For example, the server may include a processor, a Network Interface Card (NIC), a short-term memory unit (e.g., Random Access Memory (RAM)), and a long-term storage unit (e.g., a hard disk drive).

The server may receive from the client device a request to read data from the long-term storage unit. In response, the requested data is copied (e.g., by the processor) from the long-term storage unit into the short-term storage unit; and the NIC of the server then reads the requested data from the short-term memory unit and sends it over the network to the client device.

Unfortunately, this process may result in a relatively slow flow of data. For example, the long-term memory unit may include mechanically moving parts, and may operate relatively slowly. Additionally, the server may be required to serve multiple client devices, and incoming requests may be placed into one or more queues, which need to be managed and handled. Furthermore, the requested data is copied into the short-term memory unit of the server, thereby consuming time and/or processing power.

SUMMARY

Some embodiments include, for example, devices, systems, and methods of accessing storage.

In some embodiments, for example, a server includes: a Solid-State Drive (SSD) to store data; a memory mapper to map at least a portion of a storage space of the SSD into a memory space of the server; a network adapter to receive a Small Computer System Interface (SCSI) read command incoming from a client device, to map one or more parameters of the SCSI read command into an area of the memory space of the server from which data is requested to be read by the client device, said area corresponding to a storage area of the SSD, and to issue a Remote Direct Memory Access (RDMA) write command to copy data directly to the client device from said area of the memory space corresponding to the SSD.

In some embodiments, the network adapter is to map the one or more parameters of the SCSI read command by calling an Application Programming Interface (API) of the SSD.

In some embodiments, the one or more parameters of the SCSI read command include at least one parameter selected from the group consisting of: a Logical Unit (LUN) parameter, a sector parameter, and a size parameter.

In some embodiments, the network adapter is to perform the RDMA write command based on a Steering Tag provided by the client device.

In some embodiments, the server further includes a Random Access Memory (RAM) to temporarily store data, and the network adapter is to copy the data to the client device from said area of the memory space of the server corresponding to the SSD through a direct data path excluding the RAM.

In some embodiments, the server further includes a Central Processing Unit (CPU) to execute instructions, and the network adapter is to copy the data to the client device from said area of the memory space of the server corresponding to the SSD using a direct copy process excluding said CPU.

In some embodiments, completion of the RDMA write command, the network adapter is to issue to the client device a SCSI Command Response (CR) to indicate said completion.

In some embodiments, substantially immediately with issuing the RDMA write command, the network adapter is to post to the client device a SCSI Command Response (CR) associated with a fencing requirement.

In some embodiments, the network adapter includes a Direct Data Placement (DDP) network adapter, and the DDP network adapter is to copy the data to the client device from said area of the memory space of the server corresponding to the SSD through a DDP data path.

In some embodiments, a computer includes: a Solid-State Drive (SSD) to store data; a memory mapper to map at least a portion of a storage space of the SSD into a memory space of the computer; and a network adapter to receive a Small Computer System Interface (SCSI) write command incoming from a client device, to map one or more parameters of the SCSI write command into an area of the memory space of the computer to which data is requested to be written by the client device, said area corresponding to a storage area of the SSD, and to issue a Remote Direct Memory Access (RDMA) read command to copy data directly from the client device to said area of the memory space corresponding to the SSD.

In some embodiments, the network adapter is to map the one or more parameters of the SCSI write command by calling an Application Programming Interface (API) of the SSD.

In some embodiments, the one or more parameters of the SCSI write command include at least one parameter selected from the group consisting of: a Logical Unit (LUN) parameter, a sector parameter, and a size parameter.

In some embodiments, the network adapter is to perform the RDMA read command based on a Steering Tag provided by the client device.

In some embodiments, the computer further includes a Random Access Memory (RAM) to temporarily store data, and the network adapter is to copy the data from the client device to said area of the memory space of the computer corresponding to the SSD through a direct data path excluding the RAM.

In some embodiments, the computer further includes a Central Processing Unit (CPU) to execute instructions, and the network adapter is to copy the data from the client device to said area of the memory space of the computer corresponding to the SSD using a direct copy process excluding said CPU.

In some embodiments, upon completion of the RDMA read command, the network adapter is to issue to the client device a SCSI Command Response (CR) to indicate said completion.

In some embodiments, substantially immediately with issuing the RDMA read command, the network adapter is to post to the client device a SCSI Command Response (CR) associated with a fencing requirement.

In some embodiments, the network adapter includes a Direct Data Placement (DDP) network adapter, and the DDP network adapter is to copy the data from the client device to said area of the memory space of the computer corresponding to the SSD through a DDP data path.

In some embodiments, a method includes: mapping at least a portion of a storage space of a Solid-State Drive (SSD) of a server into a memory space of the server; receiving, by a network adapter of the server, a Small Computer System Interface (SCSI) read command incoming from a client device; mapping one or more parameters of the SCSI read command into an area of the memory space of the server from which data is requested to be read by the client device, said area corresponding to a storage area of the SSD; and issuing a Remote Direct Memory Access (RDMA) write command to copy data directly to the client device from said area of the memory space corresponding to the SSD.

In some embodiments, mapping one or more parameters of the SCSI read command includes: calling an Application Programming Interface (API) of the SSD; and the one or more parameters of the SCSI read command include at least one parameter selected from the group consisting of: a Logical Unit (LUN) parameter, a sector parameter, and a size parameter.

In some embodiments, the method includes: copying the data to the client device from said area of the memory space of the server corresponding to the SSD through a direct data path which excludes a Random Access Memory (RAM) of the server and further excludes a Central Processing Unit (CPU) of the server.

In some embodiments, the method includes: upon completion of the RDMA write command, issuing to the client device a SCSI Command Response (CR) to indicate said completion.

In some embodiments, the method includes: substantially immediately with issuing the RDMA write command, posting to the client device a SCSI Command Response (CR) associated with a fencing requirement.

In some embodiments, the network adapter includes a Direct Data Placement (DDP) network adapter, and the method includes: copying the data to the client device from said area of the memory space of the server corresponding to the SSD through a DDP data path.

In some embodiments, a method includes: mapping at least a portion of a storage space of a Solid-State Drive (SSD) of a server into a memory space of the server; receiving, by a network adapter of the server, a Small Computer System Interface (SCSI) write command incoming from a client device; mapping one or more parameters of the SCSI write command into an area of the memory space of the server to which data is requested to be written by the client device, said area corresponding to a storage area of the SSD; and issuing a Remote Direct Memory Access (RDMA) read command to copy data directly from the client device to said area of the memory space corresponding to the SSD.

In some embodiments, mapping one or more parameters of the SCSI write command includes: calling an Application Programming Interface (API) of the SSD; and the one or more parameters of the SCSI write command include at least one parameter selected from the group consisting of: a Logical Unit (LUN) parameter, a sector parameter, and a size parameter.

In some embodiments, the method includes: copying the data from the client device to said area of the memory space of the server corresponding to the SSD through a direct data path which excludes a Random Access Memory (RAM) of the server and further excludes a Central Processing Unit (CPU) of the server.

In some embodiments, the method includes: upon completion of the RDMA read command, issuing to the client device a SCSI Command Response (CR) to indicate said completion.

In some embodiments, the method includes: substantially immediately with issuing the RDMA read command, posting to the client device a SCSI Command Response (CR) associated with a fencing requirement.

In some embodiments, the network adapter includes a Direct Data Placement (DDP) network adapter, and the method includes: copying the data from the client device to said area of the memory space of the server corresponding to the SSD through a DDP data path.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The terms "Remote Direct Memory Access" and "RDMA" as used herein include, for example, hardware and/or software and/or infrastructure and/or fabric and/or links and/or adapters and/or architectures, which allow direct hardware access to write from a local memory to a remote or local node's memory and/or to read from a remote or local node's memory to a local node's memory; for example, substantially without involving the Operating System (OS) of the remote computer, or by substantially bypassing the OS of the remote computer. Additionally or alternatively, RDMA may be implemented, for example, substantially without involving the OS of the initiating node, or by substantially bypassing the OS of the initiating node. In some embodiments, RDMA may provide high-throughput, low-latency, zero-copy networking; and may allow a network adapter (e.g., a Network Interface Card (NIC), a Host Channel Adapter (FICA), or the like) to transfer data directly to or from application memory, eliminating the need to copy data between application memory and OS data buffers; as well as eliminating utilization of processors, caches, and/or context switches, and further allowing data transfer simultaneously and/or in parallel with other operations. In some embodiments, the term "RDMA" may include mechanisms or operations that are similar to Remote Direct Memory Access; or that can be used instead of or in addition to Remote Direct Memory Access, for example, iWarp or Direct Data Placement (DDP), which may be used in conjunction with various types of infrastructures, e.g., InfiniBand, Ethernet, or the like; or other offload mechanisms.

The terms "communication unit" or "Network Interface Card" or "NIC" or "NIC/HCA" as used herein include, for example, a Host Channel Adapter (HCA), a RDMA-capable NIC or HCA or HBA, an Ethernet NIC or HCA or HBA, a NIC or HCA or HBA or card or adapter with TCP offload capabilities, a Host Bus Adapter (HBA), a Fibre Channel (FC) HBA, a Fibre Channel over Ethernet (FCoE) HBA, a RDMA-capable hardware component or card or adapter, a NIC or HCA or HBA that supports Direct Data Placement (e.g., an Internet SCSI (iSCSI) HBA), a NIC or HCA or HBA having OS-bypass capabilities, an InfiniBand NIC or HCA or card or adapter, an iWarp NIC or HCA or card or adapter, a card or adapter able to bypass OS and/or kernel and/or driver(s), a card or adapter able to directly access a memory of a remote device or server or node, or the like.

The term "Ethernet" as used herein includes, for example, Ethernet, Ethernet in accordance with IEEE 802.3 standard and/or 802.2 standard and/or other standards, Gigabit Ethernet (GEth), 10-Gigabit Ethernet, 100-Gigabit Ethernet, Fast Ethernet, Converged Ethernet, or other types of Ethernet.

The terms "Operating System (OS) bypassing" or "OS bypass" as used herein include, for example, a substantially complete or a partial OS bypassing, a substantially complete or a partial kernel bypassing, a substantially complete or a partial bypass of a driver, or the like. In some embodiments, OS bypass may be implemented by using system calls to OS kernel in order to execute connection control and/or memory registration for RDMA, while send and/or receive operations of data are performed mostly or solely by OS bypass.

The terms "Solid-State Drive" or "SSD" as used herein includes, for example, a data storage unit which utilizes or includes one or more solid-state memory components to store data; a long-term solid-state storage unit; a storage unit which includes flash memory and is able to emulate a hard disk drive; a long-term storage unit that includes substantially no moving parts, or substantially no mechanically-moving parts; a long-term storage unit that exclusively includes only non-moving parts and/or non-mechanically-moving parts; a long-term storage unit which does not require cooling and/or does not include a fan; a substantially completely silent and/or noiseless long-term storage unit; a long-term storage unit having a substantially constant and/or deterministic read performance, or having a substantially constant and/or deterministic read time and/or seek time across substantially the entire storage space; a low power consumption long-term storage unit; a long-term storage unit having high mechanical reliability, and/or ability to endure shocks and/or vibration and/or high altitude; a long-term storage unit having substantially no mechanical delays, having low access time and low latency; a Flash-memory based SSD; an array or an arrangement of two or more SSDs, of a common type or of different types; a Redundant Array of Independent Disks (RAID) which includes two or more SSD; or the like.

The terms "Random Access Memory" or "RAM" as used herein include, for example, one or more integrated circuits able to store data to be accessed randomly or pseudo-randomly or in substantially any order; a volatile memory which requires power in order to maintain the stored data; Static RAM (SRAM), or RAM which stores a bit of data using a state of a flip-flop; Dynamic RAM (DRAM), or RAM which stores a bit of data using a charge in a capacitor or a transistor gate; Synchronous DRAM (SDRAM); a memory unit having one or more RAM packages or RAM modules, for example, one or more Single In-line Memory Modules (SIMMs) or Dual In-line Memory Modules (DIMMs); a Double Data Rate (DDR) SDRAM; or the like.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NTC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry®, Palm® Treo®, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee®, Ultra-Wideband (UWB), Global System for Mobile communication (GSM), 2G, 2.5G, 3G, Third Generation Partnership Project (3GPP), 3GPP Long Term Evolution (LTE), 3.5G, or the like. Some embodiments may be used in conjunction with various other devices, systems and/or networks.

Although some portions of the discussion herein relate, for demonstrative purposes, to a fast or high-speed interconnect infrastructure, to a fast or high-speed interconnect component or adapter with OS bypass capabilities, to a fast or high-speed interconnect card or Network Interface Card (NIC) with OS bypass capabilities, or to a to a fast or high-speed interconnect infrastructure or fabric, some embodiments are not limited in this regard, and may be used in conjunction with other infrastructures, fabrics, components, adapters, host channel adapters, cards or NICs, which may or may not necessarily be fast or high-speed or with OS bypass capabilities. For example, some embodiments may be utilized in conjunction with InfiniBand (IB) infrastructures, fabrics, components, adapters, host channel adapters, cards or NICs; with iWarp infrastructures, fabrics, components, adapters, host channel adapters, cards or NICs; with Ethernet infrastructures, fabrics, components, adapters, host channel adapters, cards or NICs; with Ethernet TCP offload infrastructures, fabrics, components, adapters, host channel adapters, cards or NICs; with Ethernet (e.g., Fast Ethernet, Gigabit Ethernet (GEth), 10-Gigabit Ethernet, 100-Gigabit Ethernet, or other types of Ethernet) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs that have OS-bypass capabilities; with infrastructures, fabrics, components, adapters, host channel adapters, cards or NICs that are connectionless and/or stateless; and/or other suitable hardware.

Figure 1:
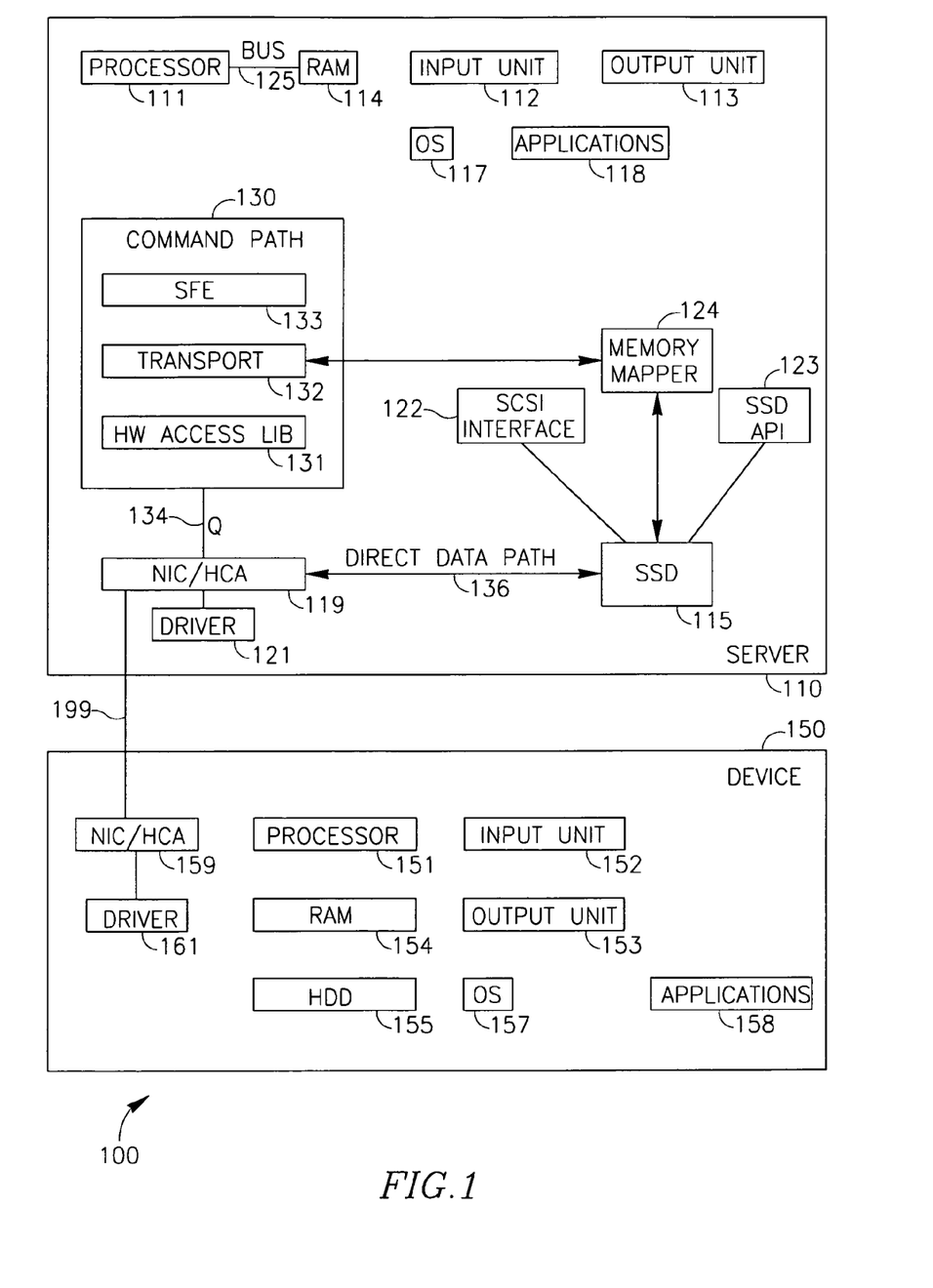
FIG. 1 is a schematic block diagram illustration of a system in accordance with some demonstrative embodiments of the invention.

FIG. 1 schematically illustrates a block diagram of a system 100 in accordance with some demonstrative embodiments. System 100 includes one or more servers, for example, a server 110. System 100 further includes one or more client devices, for example, a client device 150. Although FIG. 1 shows, for demonstrative purposes, one server 110, other numbers of servers may be used. Similarly, although FIG. 1 shows, for demonstrative purposes, one client device 150, other numbers of client devices may be used. In some embodiments, client device 150 may operate as initiator, and server 110 may operate as target.

Server 110 includes, for example, a processor 111, an input unit 112, an output unit 113, a RAM 114, and a SSD 115. Server 110 may optionally include other suitable hardware components and/or software components. Server 110 may be implemented, for example, using a computing platform or a server computer.

Processor 111 may include, for example, a Central Processing Unit (CPU), a Digital Signal Processor (DSP), one or more processor cores, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may execute instructions, for example, of an Operating System (OS) 117 of server 110 or of one or more software applications 118.

Input unit 112 may include, for example, a keyboard, a keypad, a mouse, a touch-pad, a track-ball, a track-wheel, a thumb-wheel, a scroll-wheel, a stylus, one or more buttons or sliders, a microphone, or other suitable pointing device or input device.

Output unit 113 may include, for example, a monitor, a screen, a Cathode Ray Tube (CRT) display unit, a Liquid Crystal Display (LCD) display unit, a plasma display unit, a projector, a projection device, a television, a High Definition Television (HDTV) display unit, one or more audio speakers, or other suitable output devices.

The RAM 114 may include, for example, one or more DIMMs or SIMMs or other volatile memory components.

The SSD 115 may include, for example, one or more SSDs, or an array or arrangement of multiple SSDs. The SSD 115 may be connected to, for example, a Small Computer System Interface (SCSI) interface 122, e.g., a SCSI bus, SCSI connector, SCSI controller, or SCSI card. The SSD 115 may be controlled, for example, using a SSD Application Programming Interface (API) 123. In some embodiments, a Advanced Technology Attachment (ATA) or Serial ATA (SATA) interfaces, bus, connectors, drives, cards and/or SSDs may be used, for example, instead of SCSI or in addition to SCSI.

Server 110 may further include a communication unit, for example, a wired or wireless Network Interface Card (NIC), a Host Channel Adapter (HCA), an InfiniBand HCA, a wired or wireless modem, a wired or wireless router or switch or hub, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, the communication unit may include, or may be associated with, one or more antennas, for example, a dipole antenna, a monopole antenna, an omni-directional antenna, an end fed antenna, a circularly polarized antenna, a micro-strip antenna, a diversity antenna, or the like.

For demonstrative purposes, server 110 includes a NIC/HCA 119. For example, the NIC/HCA 119 may include a fast or high-speed interconnect card or adapter or HCA; a NIC or HCA having OS bypass and/or RDMA capabilities; an InfiniBand (IB) NIC or HCA; an Ethernet NIC or HCA; an Ethernet (e.g., Fast Ethernet, Gigabit Ethernet (GEth), 10-Gigabit Ethernet, Converged Ethernet NIC (C-NIC), 100-Gigabit Ethernet, or other types of Ethernet) NIC or HCA; a NIC or HCA that allows an application (e.g., a user-mode application) to directly access hardware, and/or to directly access remote hardware (e.g., using RDMA); a RDMA-capable NIC or HCA; a NIC or HCA that allows a user-mode application to bypass call(s) to a local OS and/or to an OS of a remote device; a connectionless and/or stateless NIC or HCA; and/or other suitable hardware. Optionally, NIC 119 may be associated with a driver 121, for example, a software module or an interface allowing other software components of server 110 (e.g., the OS 117 or the applications 118) to interact with the NIC 119.

In some embodiments, the components of server 110 may be arranged or enclosed in a common housing or packaging, and may be interconnected or coupled or operably associated using one or more wired or wireless links. In other embodiments, components of server 110 may be distributed among multiple or separate devices or locations.

Client device 150 includes, for example, a processor 151, an input unit 152, an output unit 153, a RAM 154 or other short-term memory unit, an optional Hard Disk Drive (HDD) 155 or other long-term storage unit (although in some embodiments, client device 150 need not include a long-term storage unit), an OS 157, one or more software applications 158, and a NIC 159 optionally associated with a driver 161.

In some embodiments, for example, the NIC 119 of server 110 may be connected to the NIC 159 of client device 150 through a network or through one or more wired and/or wireless links, for example, a link 199. Link 199 may include, for example, a fast or high-speed interconnect link; a link able to allow OS bypassing; an InfiniBand (IB) link; an Ethernet (e.g., Fast Ethernet, Gigabit Ethernet (GEth), 10-Gigabit Ethernet, 100-Gigabit Ethernet, or other types of Ethernet) link; a Fibre Channel (FC) link; a link that allows a user-mode application of the client device 150 to directly access hardware (e.g., RAM 114) of server 110; a link that allows a user-mode application of the client device 150 to utilize RDMA in order to directly access remote hardware (e.g., RAM 114) of server 110; a RDMA-capable link; a link that allows Direct Data Placement (DDP); a link that allows a user-mode application to bypass call(s) to a local OS and/or to an OS of a remote device; a link that allows connectionless and/or stateless communication; and/or other suitable wired or wireless links, fabrics, or infrastructures.

In accordance with some embodiments, a software and/or hardware architecture may be used to allow rapid and/or efficient access by the client device 150 to the SSD 115 of server 110. For example, the client device 150 issues a request (e.g., a read request or a write request), which is transferred from the client device 150 over the link 199 to the server 110; and a response is transferred back from the server 110 over the link 199 to the client device 150. In some embodiments, substantially the entire flow (namely, the incoming request, the handling of the request, and the outgoing response) runs in a single running context.

In accordance with some embodiments, the SSD 115 is mapped into the memory space (e.g., to the physical and/or virtual memory space) of server 110. The mapping is performed by a mapper module 124, which may be implemented, for example, as part of SSD 115, as part of OS 117, as a memory file system, as part of application(s) 118, as part of SCSI interface 122, as part of SCSI API 123 or utilizing the SSD API 123, or as a stand-alone or separate hardware component and/or software component. The memory mapper 124 controls memory pages, and controls mapping of memory pages to SSD 115.

In some embodiments, system 100 allows rapid and/or efficient read access by the client device 150 to the SSD 115 of server 110. For example, the NIC/HCA 119 of server 110 receives from the client device 150 a SCSI read command. The SCSI read command includes one or more parameters, for example, a Logical Unit (LUN) parameter, a sector parameter, and a size parameter. The NIC/HCA 119 calls the SSD API 123 in order to map the parameters of the SCSI read command into a physical address of the SSD 115, namely, a pointer to a physical memory area from which the requested data is to be read. The NIC/HCA 119 issues a RDMA-write (RW) in order to copy data directly from that physical address of the SSD 115 to the client device 150. The RDMA-write is performed, for example, based on a Steering-Tag (STag) or other network Virtual Address (VA) indicator provided by the client device 150, indicating the memory location in client device 150 into which the data is to be placed. In some embodiments, once the RDMA-write operation completes, the NIC/HCA 119 sends a SCSI Command Response (CR) to the client device 150, to indicate completion; the CR is sent serially, namely, once the RDMA-write operation completes. In other embodiments, the CR may be posted substantially immediately with the RDMA-write, using a fencing mechanism; for example, the CR is issued with the RDMA-write operation and together with a fencing requirement, which ensures that the CR is received at the client device 150 only upon completion of the RDMA-write.

In some embodiments, system 100 allows rapid and/or efficient write access by the client device 150 to the SSD 115 of server 110. For example, the NIC/HCA 119 of server 110 receives from the client device 150 a SCSI write command. The SCSI write command includes one or more parameters, for example, a Logical Unit (LUN) parameter, a sector parameter, and a size parameter. The NIC/HCA 119 calls the SSD API 123 in order to map the parameters of the SCSI write command into a physical address of the SSD 115, namely, a pointer to a physical memory area into which the requested data is to be written. The NIC/HCA 119 issues a RDMA-read (RR) in order to copy data directly from the client device 150 to that physical address of the SSD 115. The RDMA-read is performed, for example, based on a Steering-Tag (STag) or other network Virtual Address (VA) indicator provided by the client device 150, indicating the memory location in client device 150 from which the data is to be read. In some embodiments, once the RDMA-read operation completes, the NIC/HCA 119 sends a SCSI Command Response (CR) to the client device 150, to indicate completion; the CR is sent serially, namely, once the RDMA-read operation completes. In other embodiments, the CR may be posted substantially immediately with the RDMA-read, using a fencing mechanism; for example, the CR is issued with the RDMA-read operation and together with a fencing requirement, which ensures that the CR is received at the client device 150 only upon completion of the RDMA-read.

In some embodiments, a single-context command path 130 is used, including, for example, a hardware access library 131, a transport layer 132, and a Storage Forwarding Engine (SFE) 133 (e.g., a SCSI forwarding engine). Optionally, a queue element may further be included, e.g., to manage or handle queue(s) between the NIC/HCA 119 and the command path 130. The transport layer 132 may be associated with the memory mapper 124, which in turn controls the mapping of the SSD 115 storage space into memory pages. A direct data path 136 allows rapid transfer of data between the NIC/HCA 119 and the SSD 115, for example, using DMA or using Peer to Peer or Point to Point (P2P) input/output. Other suitable architectures may be used.

In some embodiments, substantially the entire storage space of SSD 115 is mapped at once to the physical memory space of server 110. In other embodiments, for example, particularly if the storage space of SSD 115 is significantly large, the storage space of SSD 115 is mapped to the physical memory space in portions (e.g., "chunks" or "windows"); and the SSD API 123 may perform mapping of the relevant portion into memory space. In still other embodiments, for example, utilizing Journaling Flash File System (JFFS) or JFFS-2, one or more lookup operations may be used in order to retrieve the physical address in SSD 115 which corresponds to the parameters of an incoming SCSI request.

In some embodiments, system 100 may not support RDMA operations, but may still allow rapid and/or efficient read/write access by the client device 150 to the SSD 115 of server 110. For example, some embodiments may utilize Direct Data Placement (DDP) implemented using hardware Ready-to-Transmit (R2T) mechanism; or other suitable infrastructures, e.g., InfiniBand, iWarp, Gigabit Ethernet, FC, FCoE, iSCSI, or the like. In some embodiments, the transfer of data from client device 150 to SSD 115, or vice versa, may be performed using OS-bypass, or by otherwise bypassing at least a portion of OS 117 and/or driver 121.

In some embodiments, the latency of serving an Input/Output (I/O) request is decreased, and the number of I/O operations per second is increased, for example, to values which depend substantially exclusively on the capabilities of link 199 and SSD 115, and do not depend on the capability and/or availability of processor 111, RAM 114 and/or OS 117. Some embodiments may be utilized in order to achieve efficiency of, for example, under one microsecond I/O latency, and/or order-of-million I/O operations per seconds.

Some embodiments allow reduction of the cost of server 110. For example, in order to efficiently handle I/O operations, server 110 may not utilize the RAM 114, and therefore a smaller RAM may be included in server 110. Similarly, in order to efficiently handle I/O operations, server 110 may not utilize processor 111, and therefore a slower processor may be included in server 110. Similarly, a slower or cheaper memory bus 125 (e.g., which connects the processor 111 and the RAM 114) may be included in server 110. In some embodiments, thus, server 110 may be implemented using slower or cheaper components, and may provide improved I/O performance. Some embodiments may reduce the cost per I/O operation; may reduce the power consumption per I/O operation; may reduce (e.g., to zero) the processor 111 processing cycles per I/O operation; may reduce (e.g., to substantially zero) the RAM 114 utilization per I/O operation; may reduce (e.g., to substantially zero) the memory bus 125 utilization per I/O operation; or may otherwise increase system efficiency.

Some embodiments may utilize a memory-mapped SSD 115 in order to allow rapid access and/or "zero RAM copy" access to data stored in the SSD 115. Some embodiments need not include, and need not utilize, a queue or multiple queues (e.g., in a multi-layer architecture) between in order to store, manage and/or handle incoming requests to access the data stored in the memory-mapped SSD 115. Some embodiments may avoid copying of data into the RAM 114 (e.g., by the processor 111 or using a local Direct Memory Access (DMA) mechanism); and may avoid transfer of the data from the SSD 115 to the NIC/HCA 119 through the RAM 114.

Figure 2:
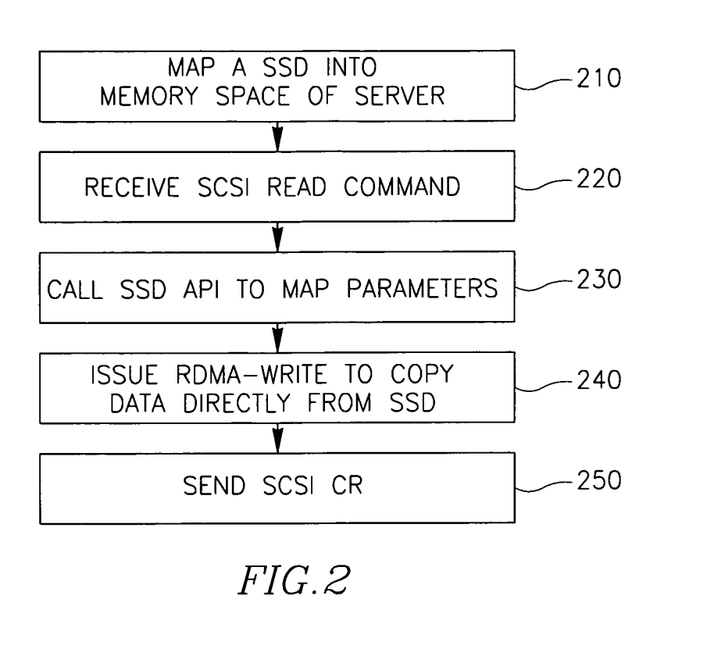
FIG. 2 is a schematic flow-chart of a method of reading from storage, in accordance with some demonstrative embodiments of the invention.

FIG. 2 is a schematic flow-chart of a method of reading from storage, in accordance with some demonstrative embodiments of the invention. Operations of the method may be used, for example, by system 100 of FIG. 1, by server 110 of FIG. 1, and/or by other suitable units, devices and/or systems.

In some embodiments, the method may include, for example, mapping a SSD into the physical memory space of a server (block 210).

In some embodiments, the method may include, for example, receiving by a NIC/HCA of the server, from a client device, a SCSI read command (block 220).

In some embodiments, the method may include, for example, calling (e.g., by the NIC/HCA of the server) a SSD API to map parameters of the SCSI read command into a physical address of the SSD (block 230).

In some embodiments, the method may include, for example, issuing (e.g., by the NIC/HCA of the server) a RDMA-write in order to copy data directly from that physical address of the SSD to the client device (block 240).

In some embodiments, the method may include, for example, sending (e.g., by the NIC/HCA of the server) a SCSI Command Response (CR) to the client device, to indicate completion; optionally utilizing a fencing mechanism (block 250).

Other suitable operations or sets of operations may be used in accordance with some embodiments.

Figure 3:
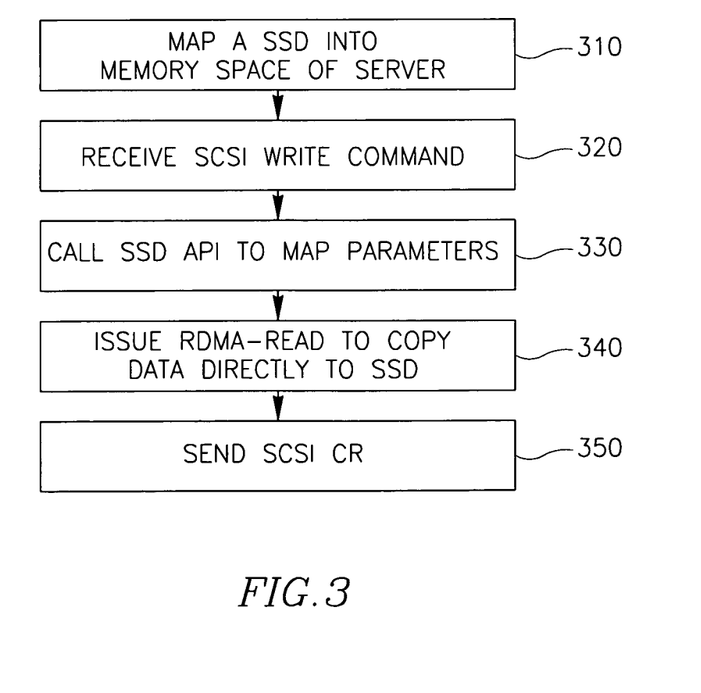
FIG. 3 is a schematic flow-chart of a method of writing into storage, in accordance with some demonstrative embodiments of the invention.

FIG. 3 is a schematic flow-chart of a method of writing into storage, in accordance with some demonstrative embodiments of the invention. Operations of the method may be used, for example, by system 100 of FIG. 1, by server 110 of FIG. 1, and/or by other suitable units, devices and/or systems.

In some embodiments, the method may include, for example, mapping a SSD into the physical memory space of a server (block 310).

In some embodiments, the method may include, for example, receiving by a NIC/HCA of the server, from a client device, a SCSI write command (block 320).

In some embodiments, the method may include, for example, calling (e.g., by the NIC/HCA of the server) a SSD API to map parameters of the SCSI read command into a physical address of the SSD (block 330).

In some embodiments, the method may include, for example, issuing (e.g., by the NIC/HCA of the server) a RDMA-read in order to copy data directly from the client device into that physical address of the SSD (block 340).

In some embodiments, the method may include, for example, sending (e.g., by the NIC/HCA of the server) a SCSI Command Response (CR) to the client device, to indicate completion; optionally utilizing a fencing mechanism (block 350).

Other suitable operations or sets of operations may be used in accordance with some embodiments.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A server comprising:
   a Solid-State Drive (SSD) to store data;
   a memory mapper to map at least a portion of a storage space of the SSD into a memory space of the server; and
   a network adapter to receive a Small Computer System Interface (SCSI) read command incoming from a client device, to map one or more parameters of the SCSI read command into an area of the memory space of the server from which data is requested to be read by the client device, said area corresponding to a storage area of the SSD, and to issue a Remote Direct Memory Access (RDMA) write command to copy data directly to the client device from said area of the memory space corresponding to the SSD.

2. The server of claim 1, wherein the network adapter is to map the one or more parameters of the SCSI read command by calling an Application Programming Interface (API) of the SSD.

3. The server of claim 2, wherein the one or more parameters of the SCSI read command comprise at least one parameter selected from the group consisting of: a Logical Unit (LUN) parameter, a sector parameter, and a size parameter.

4. The server of claim 1, wherein the network adapter is to perform the RDMA write command based on a Steering Tag provided by the client device.

5. The server of claim 1, wherein the server further comprises a Random Access Memory (RAM) to temporarily store data, and wherein the network adapter is to copy the data to the client device from said area of the memory space of the server corresponding to the SSD through a direct data path excluding the RAM.

6. The server of claim 1, wherein the server further comprises a Central Processing Unit (CPU) to execute instructions, and wherein the network adapter is to copy the data to the client device from said area of the memory space of the server corresponding to the SSD using a direct copy process excluding said CPU.

7. The server of claim 1, wherein upon completion of the RDMA write command, the network adapter is to issue to the client device a SCSI Command Response (CR) to indicate said completion.

8. The server of claim 1, wherein substantially immediately with issuing the RDMA write command, the network adapter is to post to the client device a SCSI Command Response (CR) associated with a fencing requirement.

9. The server of claim 1, wherein the network adapter comprises a Direct Data Placement (DDP) network adapter, and wherein the DDP network adapter is to copy the data to the client device from said area of the memory space of the server corresponding to the SSD through a DDP data path.

10. A computer comprising:
a Solid-State Drive (SSD) to store data;
a memory mapper to map at least a portion of a storage space of the SSD into a memory space of the computer; and
a network adapter to receive a Small Computer System Interface (SCSI) write command incoming from a client device, to map one or more parameters of the SCSI write command into an area of the memory space of the computer to which data is requested to be written by the client device, said area corresponding to a storage area of the SSD, and to issue a Remote Direct Memory Access (RDMA) read command to copy data directly from the client device to said area of the memory space corresponding to the SSD.

11. The computer of claim 10, wherein the network adapter is to map the one or more parameters of the SCSI write command by calling an Application Programming Interface (API) of the SSD.

12. The computer of claim 11, wherein the one or more parameters of the SCSI write command comprise at least one parameter selected from the group consisting of: a Logical Unit (LUN) parameter, a sector parameter, and a size parameter.

13. The computer of claim 10, wherein the network adapter is to perform the RDMA read command based on a Steering Tag provided by the client device.

14. The computer of claim 10, wherein the computer further comprises a Random Access Memory (RAM) to temporarily store data, and wherein the network adapter is to copy the data from the client device to said area of the memory space of the computer corresponding to the SSD through a direct data path excluding the RAM.

15. The computer of claim 10, wherein the computer further comprises a Central Processing Unit (CPU) to execute instructions, and wherein the network adapter is to copy the data from the client device to said area of the memory space of the computer corresponding to the SSD using a direct copy process excluding said CPU.

16. The computer of claim 10, wherein upon completion of the RDMA read command, the network adapter is to issue to the client device a SCSI Command Response (CR) to indicate said completion.

17. The computer of claim 10, wherein substantially immediately with issuing the RDMA read command, the network adapter is to post to the client device a SCSI Command Response (CR) associated with a fencing requirement.

18. The computer of claim 10, wherein the network adapter comprises a Direct Data Placement (DDP) network adapter, and wherein the DDP network adapter is to copy the data from the client device to said area of the memory space of the computer corresponding to the SSD through a DDP data path.

19. A method comprising:
mapping at least a portion of a storage space of a Solid-State Drive (SSD) of a server into a memory space of the server;
receiving, by a network adapter of the server, a Small Computer System Interface (SCSI) read command incoming from a client device;
mapping one or more parameters of the SCSI read command into an area of the memory space of the server from which data is requested to be read by the client device, said area corresponding to a storage area of the SSD; and
issuing a Remote Direct Memory Access (RDMA) write command to copy data directly to the client device from said area of the memory space corresponding to the SSD.

20. A method comprising:
mapping at least a portion of a storage space of a Solid-State Drive (SSD) of a server into a memory space of the server;
receiving, by a network adapter of the server, a Small Computer System Interface (SCSI) write command incoming from a client device;
mapping one or more parameters of the SCSI write command into an area of the memory space of the server to which data is requested to be written by the client device, said area corresponding to a storage area of the SSD; and
issuing a Remote Direct Memory Access (RDMA) read command to copy data directly from the client device to said area of the memory space corresponding to the SSD.

* * * * *